United States Patent [19]
Wolfinger

[11] 3,886,449
[45] May 27, 1975

[54] POWER MEASUREMENT CIRCUIT
[75] Inventor: John F. Wolfinger, Schenectady, N.Y.
[73] Assignee: General Electric Company, Schenectady, N.Y.
[22] Filed: Mar. 6, 1974
[21] Appl. No.: 448,606

[52] U.S. Cl. ................................................ 324/142
[51] Int. Cl. ............................................ G01r 21/00
[58] Field of Search ........ 324/142, 140 R, 141, 142, 324/77 E; 235/151.3, 151.31

[56] References Cited
UNITED STATES PATENTS
3,727,132  4/1973  Antoniu ............................. 324/142

Primary Examiner—Stanley T. Krawczewicz
Attorney, Agent, or Firm—John F. Ahern; James W. Mitchell

[57] ABSTRACT

A method and apparatus for detecting and measuring non-synchronous frequency oscillatory power in a power transmission system. Current measuring devices and voltage measuring devices are connected to supply signals corresponding to instantaneous currents and voltages in the system. The current and voltage signals are combined in a multiplier to produce a signal proportional to instantaneous power in the system. The power signal is processed through a filter circuit to remove the average value component and the component at synchronous power generating frequency to produce an output signal representative only of non-synchronous frequency oscillatory power.

6 Claims, 1 Drawing Figure

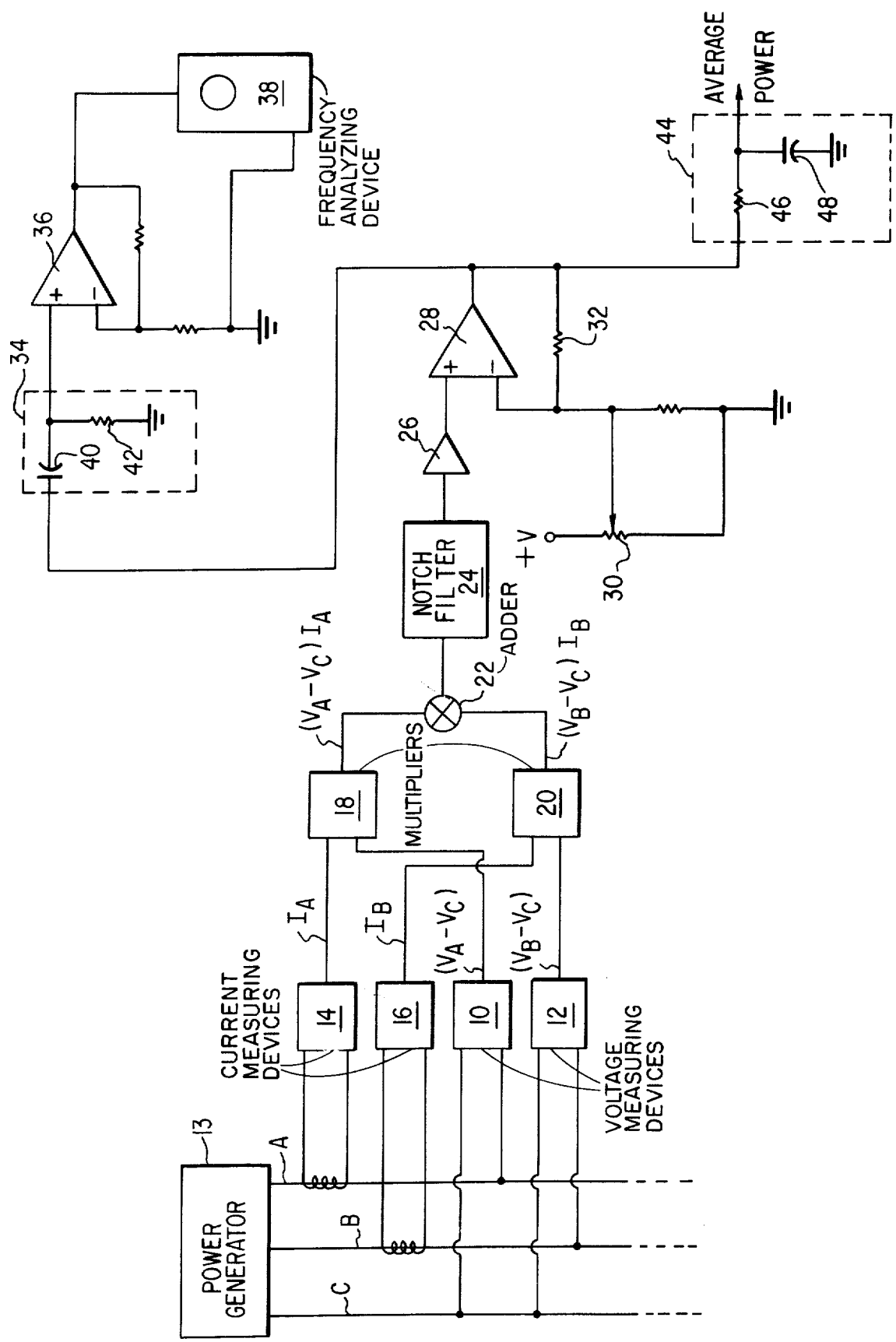

0
POWER MEASUREMENT CIRCUIT

This invention relates to power measurement apparatus for power generating equipment and, more particularly, to power measurement apparatus for detecting and measuring non-synchronous frequency oscillatory currents which occur on power transmission lines associated with the power generation equipment.

BACKGROUND OF THE INVENTION

When series capacitors are used in electric utility transmission systems to reduce the reactive component of line impedance, an oscillatory electric circuit is created that has a natural electrical frequency in the sub-synchronous frequency range, generally between 10 and 50 Hz. as contrasted to the power generating operating, or synchronous, frequency of 60 Hz. Transient currents in the sub-synchronous frequency range interact with the field excitation on the generator rotor of the power generating equipment to produce pulsating air-gap torques at slip frequency, that is, between 20 and 50 Hz. The slip frequency air-gap torques produce rotor oscillations and corresponding torques in the shafts connecting the generator and turbine rotors of power generating equipment. If the slip frequency torque happens to correspond closely to any of the mechanical torsional natural frequencies of the turbine generator assembly, all of which are less than 60 Hz. in modern machines, the resulting rotor motions of the power generating equipment can become appreciable and the corresponding shaft torques that develop can be damaging and, as for example, may cause breakage of a shaft. Furthermore, the generator rotor motion produces a voltage in the armature circuit which reinforces the electrical system natural frequency currents so that they may decay more slowly than they would for constant rotor speed, or actually increase to the point where they become unstable, in which case they will build up spontaneously to damaging levels without any large initiating system disturbance.

It is highly desirable to maintain continuing operation of a power generating system, although such power generating system is subjected to widely varying conditions over a period of time. The varying conditions include fault current, switching operations, varying loads and varying voltage-current phase relationships. A number of procedures have been proposed to correct for and eliminate the sub-synchronous frequency oscillations generated by such varying conditions. However, in order to provide the correct procedure for eliminating the particular sub-synchronous frequency oscillations in a particular system it is necessary to determine at what frequency these oscillations are occurring.

In accordance with the present need in the art, it is an object of the invention to provide a new and improved circuit for measuring the non-synchronous frequency voltage oscillations in a power generating system.

In carrying out the object of this invention, in one form thereof, in a three-phase power generating system, a pair of voltage measuring circuits, a pair of current measuring circuits and a pair of voltage and current multipliers to convert the voltage and current signals provided by the voltage and current measuring circuits respectively to a power signal and a filtering circuit for extracting from the power signal a signal representative of non-synchronous frequency oscillations is shown. The voltage measuring circuits provide signals representative of line-to-line voltages and the current measuring circuits provide signals representative of instantaneous currents in two of the lines. The multiplier circuits combine the signals from the voltage and current measuring circuits to produce signals representative of instantaneous power. The signals from the two multiplier circuits are combined to produce a resultant signal representative of total instantaneous power in the transmission system. The filtering circuit comprises a first filter for extracting from the total power signal a component produced by the synchronous power frequency oscillations and further includes a second filter for extracting the average value component of the power signal. The resultant output signal from the second filter contains only those components of power at low frequencies which it is desired to ascertain.

BRIEF DESCRIPTION OF THE DRAWINGS

For a better understanding of the invention, reference may be had to the single drawing, FIG. 1, showing the power measuring circuit of the present invention.

DESCRIPTION OF THE PREFERRED EMBODIMENT

The power measuring circuit includes first and second voltage measuring devices 10 and 12 of a type well known in the art for providing an output signal representative of the instantaneous voltage amplitude between two voltage sources such as between two phases of a three phase transmission system represented by three phase lines A, B, and C emanating from power generating source 13. The circuit further includes a pair of current measuring devices 14 and 16, also of a type well known in the art, for providing output signals representative of instantaneous current in a transmission line. Voltage measuring devices 10 and 12 are connected to provide output signals representing $(V_A - V_C)$ and $(V_B - V_C)$ respectively. Current measuring devices 14 and 16 are connected to provide output signals representing $I_A$ and $I_B$ respectively. The output signals from voltage measuring device 10 and from current measuring device 14 are multiplied in a multiplier circuit 18, well known in the art, to produce an output signal representative of the product of these two input signals. The output signals from voltage measuring device 12 and current measuring device 16 are likewise multiplied in multiplier circuit 20 similar to multiplier 18, to produce a second output signal representative of the product of these two signals. The two power signals from multiplier 18 and 20, respectively, are combined in adder 22 also well known in the art, to produce a resultant output signal representative of the total instantaneous power produced by the power generation system. As will be obvious to those skilled in the art, the output signal from adder 22 will be of the form $V_1 I_1 + V_2 I_2$ where each of the terms include a sine function. By appropriate mathematical reduction it can be shown that in the case where amplitude and frequency are constant the power equation reduces to $P(t) = C(I+A \sin 2w_o t)$ where $P(t)$ equals total instantaneous power, $C$ and $A$ represent appropriate constants and $w_o$ is the synchronous line frequency. Obviously where non-synchronous oscillations are present in the transmission system, additional terms in the equation will occur wherein the additional terms will be of the same basic format but include a sine term representative of the frequency of the non-synchronous oscillation. By removal of those terms generated by the constant frequency and amplitude signals, the remaining portion of the power signal will represent only those terms in the equation caused by the non-synchronous frequency oscillations.

The output of adder 22 is directed into a notch filter 24 which filter is of a type well known in the art for rejecting a single [or plurality of] frequency component in a signal. Notch filter 24 is tuned to twice the synchronous line frequency, i.e., $2w_o$, so that the synchronous component in the power equation produced by the line frequency is removed by filter 24. Thus, at the output of filter 24 there is provided a signal proportional to the instantaneous power in the transmission system with the $2w_o$ component removed. A buffer or unity gain amplifier 26 is provided on the output of filter 24 to isolate the filter from the remaining circuitry.

The output of unity gain amplifier 26 is directed into a first input terminal of amplifier 28. A second input terminal of amplifier 28 is connected to receive a bias voltage from offset control potentiometer 30 and also to receive a feedback signal from the output of amplifier 28 through a resistor 32. Amplifier 28 increases the signal level and resistor 30 adjusts for the DC voltage drop in filter 24. The output of amplifier 28 is connected to an input of low frequency filter 34 which removes the average value component of the power signal. The output of filter 34 represents only the components of the power signal at non-synchronous frequencies. The output signals from filter 34 are amplified in an amplifier 36 to provide sufficient drive for directing the signals into frequency analyzing device 38.

As shown in the drawing, filter 34 may be a differentiator of a type well known in the art comprising a capacitor 40 and a resistor 42. Frequency analyzing device 38 may be any of numerous types of measuring instruments for determining the amplitude and frequency content of a signal.

A signal proportional to the average power in the transmission system is obtained from the output of amplifier 28 by use of integrating filter 44 which filter is connected to receive an output signal from amplifier 28. Filter 44 may be of a type well known in the art comprising a series resistor 46 and a shunt capacitor 48.

In operation, current measuring device 14 supplies a signal to multiplier circuit 18 which signal represents the instantaneous currents in line A. Simultaneously voltage measuring circuit 10 supplies a signal to multiplier circuit 18 which signal represents the instantaneous voltage between line A and line C. Likewise current measuring device 16 supplies a signal to multiplier circuit 20 which signal represents the instantaneous currents in line B and voltage measuring device 12 supplies a signal to multiplier circuit 20 which signal corresponds to the voltage between lines B and C. Multiplier circuit 18 produces an output signal corresponding to the product of $(V_A-V_C)$ and $I_A$ and is therefore a power measuring signal. Multiplier 20 produces a signal corresponding to $(V_B-V_C)I_B$. The output signals from multiplier circuits 18 and 20 are summed in adder 22 such that the output signal from adder 22 represents total instantaneous power in the transmission system.

Filter 24 receives the output signal from adder 22 and removes therefrom the frequency component caused by the synchronous power generation frequency signal. The output signal from filter 24 is buffered by amplifier 26 and supplied to amplifier 28 which latter amplifier restores the signal to its original level before it was attenuated by filter 24.

Filter 34 receives the output signal from amplifier 28 and removes therefrom the component of average power and producing at its output a signal representing only non-synchronous voltages and currents in the transmission system. The signal from filter 34 is directed into amplifier 36 which amplifier provides drive to permit analysis of the signal in analyzer 38.

Filter 44, in parallel with filter 34, provides an output signal proportional to the average power in the transmission system.

Although the preferred embodiment utilizes only two voltage measuring devices and two current measuring devices to obtain a total power signal, it will be obvious to those skilled in the art that three voltage measuring devices and three current measuring devices could be used to obtain total power if it were preferred to measure line to neutral voltage rather than line-to-line voltages, although increased error and circuit complexity would result. Similarly, in a machine of more or less phases, various arrangements of measuring devices to obtain total instantaneous power are within the knowledge of the art. In accordance with a well-known theorem, in a system of N phases the minimum number of multipliers required for measuring power is $N-1$.

It will thus be seen that the object set forth is efficiently obtained and since certain changes may be made in the above constructions without departing from the scope of the invention, it is intended that all matter contained in the above description or shown in the accompanying drawings shall be interpreted as illustrative and not in a limiting sense.

What is claimed as new and desired to be secured by Letters Patent of the United States is:

1. Apparatus for detecting non-synchronous frequency power oscillations in a power transmission system transmitting power at a synchronous power generating frequency, said apparatus comprising:
    first means for generating a first signal representative of total instantaneous power in said transmission system;
    second means for removing a frequency component of said first signal corresponding to said power generating frequency;
    and third means for removing an average value component from said first signal to produce a second signal representative of power oscillations in said transmission systems at frequencies other than said power generating frequency.

2. The apparatus as defined in claim 1 wherein said first means comprises:
    first and second current measuring devices connected respectively to provide first and second current signals representative of instantaneous currents in two phases of a three phase transmission system;
    first and second voltage measuring devices connected respectively to provide first and second voltage signals representative of instantaneous voltage differences between first and third phases and between second and third phases of said three phase transmission system,
    first and second multiplier circuits for combining said first current signal with said first voltage signal and for combining said second current signal with said second voltage signal to provide first and second power signals respectively; and adder means for combining said first and second power signals to produce said first signal.

3. The apparatus as defined in claim 1 wherein said second means comprises a notch filter.

4. The apparatus as defined in claim 1 wherein said third means comprises an integrating filter.

5. A method for detecting non-synchronous frequency power oscillations in a power transmission system transmitting power at a synchronous power generating frequency, said method comprising the steps of:

measuring instantaneous currents in said transmission system;

measuring instantaneous voltages in said transmission system;

multiplying said instantaneous currents and said instantaneous voltage to obtain a total instantaneous power signal;

filtering said instantaneous power signal to remove a component caused by said power generating frequency; and filtering said instantaneous power signal to remove an average value component to produce a resultant signal representative of non-synchronous frequency power oscillations.

6. The method as defined in claim 5 wherein said power transmission system is a three phase system and said total instantaneous power signal is obtained by the steps of:

measuring instantaneous currents in a first and a second phase;

measuring instantaneous voltages between said first and a third phase and between said second and said third phase;

multiplying said current in said first phase by said voltage between said first and third phase to produce a first power signal;

multiplying said current in said second phase by said voltage between said second and third phase to produce a second power signal; and summing said first and second power signals.

* * * * *